(12) United States Patent
Sato

(10) Patent No.: US 6,961,191 B2
(45) Date of Patent: Nov. 1, 2005

(54) SINGLE FOCUS LENS

(75) Inventor: Kenichi Sato, Ageo (JP)

(73) Assignee: Fujinon Corporation, Saitama (JP)

( * ) Notice: Subject to any disclaimer, the term of this patent is extended or adjusted under 35 U.S.C. 154(b) by 0 days.

(21) Appl. No.: 10/790,758

(22) Filed: Mar. 3, 2004

(65) Prior Publication Data

US 2004/0190162 A1 Sep. 30, 2004

(30) Foreign Application Priority Data

Mar. 31, 2003 (JP) .......................................... 2003-094151

(51) Int. Cl.[7] .............................. G02B 9/14; G02B 9/12
(52) U.S. Cl. ....................... 359/785; 359/792; 359/784
(58) Field of Search ................................ 359/785, 792, 359/784

(56) References Cited

U.S. PATENT DOCUMENTS 5,940,219 A 8/1999 Yamada ...................... 359/642

FOREIGN PATENT DOCUMENTS

| JP | 10-48516 | 2/1998 |
|---|---|---|
| JP | 10-293253 | 11/1998 |
| JP | 2000-284177 | 10/2000 |
| JP | 2002-517773 | 6/2002 |
| JP | 2002-221659 | 8/2002 |

*Primary Examiner*—David N. Spector
(74) *Attorney, Agent, or Firm*—Arnold International; Jon W. Henry; Bruce Y. Arnold

(57) ABSTRACT

A single focus lens includes, in order from the object side: a first lens component of positive refractive power with a convex surface on the object side; a diaphragm stop; a second lens component that is made of plastic, has at least one aspheric surface and a meniscus shape, and has a concave surface on the object side near the optical axis; and, a third lens component of positive refractive power with two aspheric surfaces, one of which is convex on the object side near the optical axis. Each lens component that forms the single focus lens may consist of a lens element. Specified conditions are satisfied in order to reduce aberrations, to insure that the light rays at the image plane are substantially orthogonal to the image plane, and to insure that a sufficient back focus is provided to allow for insertion of other optical elements.

20 Claims, 2 Drawing Sheets

Spherical Aberration

Astigmatism

Distortion

Spherical Aberration

Astigmatism

Distortion

SINGLE FOCUS LENS

BACKGROUND OF THE INVENTION

In recent years, with the proliferation of personal computers into homes, digital still cameras (hereinafter referred to simply as digital cameras) that enable input of picture image information, such as photographed scenery, a portrait, or the like, into a personal computer are rapidly becoming more popular. Further, with the development of higher performance mobile cellular telephones, portable modular cameras for mounting in such cellular telephones and providing picture image input have also become more common.

An image pickup element, such as a CCD (Charge Coupled Device) or a CMOS (Complementary-Metal Oxide Semiconductor), is used in these cameras. Advancements in the miniaturization of camera elements in recent years have allowed these cameras to be designed to be extremely miniaturized as a whole. Further, advancements in achieving a larger number of pixels in the same size image pickup element has led to the development of higher image resolution and higher performance.

Japanese Laid-Open Patent Application H10-48516, Japanese Laid-Open Patent Application 2002-221659, and U.S. Pat. No. 6,441,971 describe exemplary imaging lenses for such cameras that include only three lens elements. Additionally, Japanese Laid-Open Patent Application 2002-517773 describes an imaging lens that includes only four lens elements. In the imaging lens described in Japanese Laid-Open Patent Application H10-48516, the stop is positioned between the second and third lens elements, in order from the object side. In the imaging lenses described in Japanese Laid-Open Patent Applications 2002-221659 and 2002-517773, the stop is positioned between the first and second lens elements in order from the object side. In the imaging lens described in U.S. Pat. No. 6,441,971, the stop is positioned on the object side of the first lens element in order from the object side. All of the imaging lenses described in the four patent documents discussed above have a lens element with a meniscus shape at the extreme object side of the imaging lens.

Advances in miniaturization and larger numbers of pixels in the image pickup element have increased the need for imaging lenses, especially for digital cameras, with higher resolution performance and more compactness. At the same time, although cost and compactness have been the primary requirements for the imaging lens of a portable modular camera, as advancements providing larger numbers of pixels in image pickup elements continue in portable modular cameras, the demand for improvement of optical performance has also increased recently.

Accordingly, the development of a wide variety of imaging lenses based on a comprehensive consideration of cost, performance and compactness is required. The development of an imaging lens that is low in cost and which also has high performance is required, along with satisfying the requirements of compactness that enable mounting the imaging lens in, for example, a portable modular camera, as well as giving ample consideration to the optical performance for mounting the imaging lens in a digital camera.

In response to such demands, a three-lens or a four-lens construction may be used in order to satisfy the requirements of compactness and low cost, and consideration can be given to the aggressive use of aspheric surfaces in order to achieve higher performance. In this case, an aspheric surface contributes to the compactness and higher performance. However, because the use of aspheric surfaces is disadvantageous from the manufacturing point of view and it may easily increase cost, sufficient consideration should be given to manufacturing issues before a particular design using aspheric surfaces is approved for mass production.

The imaging lenses described in each of the patent documents discussed above include aspheric surfaces in their three-lens and four-lens constructions, but, for example, in order to achieve favorable optical performance, the compactness of the imaging lenses becomes unfavorable. Generally, with a lens having a three-lens construction, even if there is adequate optical performance for a portable modular camera, the performance is inadequate for use in a digital camera. Additionally, with an imaging lens having a four-lens construction, although the optical performance can be improved over a three-lens construction, the cost and size of the imaging lens increase.

BRIEF SUMMARY OF THE INVENTION

The present invention relates to a single focus lens that can be compact, uses a small number of lens components and lens elements, can be manufactured at low cost, and can achieve high optical performance by particular use of aspheric lens surfaces. The present invention relates particularly to such a single focus lens that can be mounted in small image capturing devices.

BRIEF DESCRIPTION OF THE DRAWINGS

The present invention will become more fully understood from the detailed description given below and the accompanying drawings, which are given by way of illustration only and thus are not limitative of the present invention, wherein.

DETAILED DESCRIPTION

Figure 1:
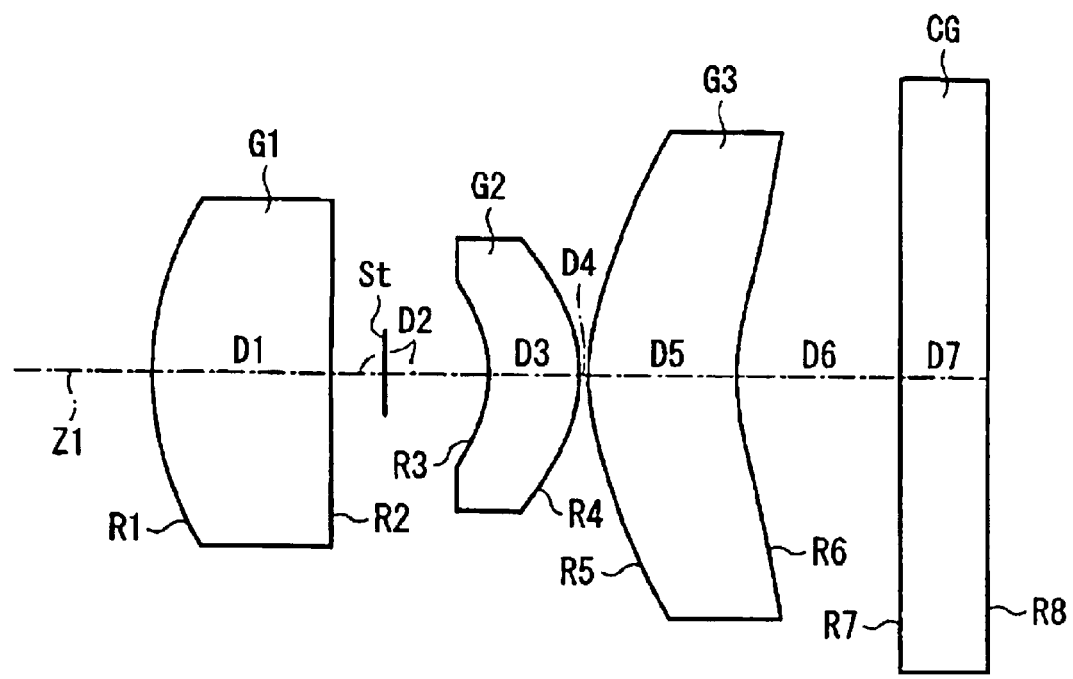
FIG. 1 shows a cross-sectional view of the single focus lens according to Embodiment 1.

A general description of preferred embodiments of the single focus lens of the present invention will now be described with reference to FIG. 1. FIG. 1 shows a cross-sectional view of the single focus lens of Embodiment 1. In FIG. 1, the lens elements of the single focus lens are referenced by the symbols G1 to G3, in order from the object side of the single focus lens along the optical axis Z1. Additionally, a cover glass on the image side of the third lens element G3 is referenced by the symbol CG. The radii of curvature of the lens elements G1 to G3 and the cover glass CG are referenced by the letter R followed by a number denoting their order from the object side of the single focus lens, from R1 to R8. The on-axis surface spacings along the optical axis Z1 between the surfaces of the optical elements are referenced by the letter D followed by a number denoting their order from the object side of the single focus lens, from D1 to D7. The single focus lens further includes a diaphragm stop St between the first lens element G1 and the second lens element G2 that operates as an aperture stop.

Definitions of the terms "lens element" and "lens component" that relate to this detailed description will now be given. The term "lens element" is herein defined as a single transparent mass of refractive material having two opposed refracting surfaces, which surfaces are positioned at least generally transversely of the optical axis of the single focus lens. The term "lens component" is herein defined as (a) a single lens element spaced so far from any adjacent lens element that the spacing cannot be neglected in computing the optical image forming properties of the lens elements or (b) two or more lens elements that have their adjacent lens surfaces either in full overall contact or overall so close together that the spacings between adjacent lens surfaces of the different lens elements are so small that the spacings can be neglected in computing the optical image forming properties of the two or more lens elements. Thus, some lens elements may also be lens components. Therefore, the terms "lens element" and "lens component" should not be taken as mutually exclusive terms. In fact, the terms may frequently be used to describe a single lens element in accordance with part (a) above of the definition of a "lens component."

In accordance with the definitions of "lens component," and "lens element" above, lens elements may also be lens components. Thus, the present invention may variously be described in terms of lens elements or in terms of lens components.

The single focus lens of the present invention can be used, for example, in a digital camera or a portable modular camera that uses an image pickup element such as a CCD or CMOS. As shown in FIG. 1, the single focus lens includes, arranged in order from the object side along the optical axis Z1, a first lens element G1, a diaphragm stop St, a second lens element G2, and a third lens element G3. An image pickup element, such as a CCD (not shown in the drawings) is arranged at the image plane of the single focus lens. A cover glass CG is arranged at or adjacent the image plane so as to protect the image-detecting elements of the CCD. In addition to the cover glass CG, other optical elements such as an infrared cut-off filter and/or a low-pass filter may also be arranged between the third lens element G3 and the image plane.

The first lens element G1 of positive refractive power has its object-side surface convex. The first lens element G1 has, for example, a meniscus shape.

The second lens element G2 is made of plastic, has at least one surface that is aspheric, has a meniscus shape with its concave surface on the object side and may have either positive or negative refractive power near the optical axis. The term "near the optical axis" is herein defined as a central region that surrounds the optical axis but excludes a substantial peripheral region surrounding the central region. At the peripheral region, the curvature of the lens surface and the refractive power of the lens element may or may not be of the same magnitude or even of the same sign, that is, either positive or negative in sign, as at the central region that is near the optical axis. In particular, the curvature and refractive power may vary based on the lens surface being aspheric. More specifically, in the present invention, when making both surfaces of the second lens element G2 to be aspheric, it is preferable that within an effective aperture range of the single focus lens, the absolute value of the negative refractive power of the object-side surface of the second lens element G2 decreases in a direction from the optical axis toward the periphery of the second lens element G2 and the positive refractive power of the image-side surface of the second lens element G2 decreases in a direction from the optical axis toward the periphery of the second lens element G2.

The third lens element G3 has a meniscus shape, positive refractive power, and an aspheric surface on each side with a convex surface near the optical axis on the object side. It is preferable that, within an effective aperture range of the single focus lens, the positive refractive power of the object-side surface of the third lens element decreases in a direction from the optical axis toward the periphery of the third lens element.

Preferably, both surfaces of the second lens element G2 and at least the object-side surface of the third lens element G3 are aspheric, as described above, and more preferably, as described above, both surfaces of the third lens element G3 are aspheric.

The lens surfaces that are aspheric are defined using the following equation:

$$Z = [(C \cdot Y^2)/\{1 + (1 - K \cdot C^2 \cdot Y^2)^{1/2}\}] + \Sigma(A_i \cdot |Y^i|) \quad \text{Equation (A)}$$

where

Z is the length (in mm) of a line drawn from a point on the aspheric lens surface at a distance Y from the optical axis to the tangential plane of the aspheric surface vertex, C is the curvature (=1/the radius of curvature, R) of the aspheric lens surface on the optical axis, Y is the distance (in mm) from the optical axis, K is the eccentricity, and $A_i$ is the ith aspheric coefficient, and the summation extends over i.

In the embodiments of the invention disclosed below, aspheric coefficients other than $A_3$–$A_{10}$ are zero and for some lens surfaces only even-numbered aspheric coefficients of the aspheric coefficients $A_3$–$A_{10}$ are non-zero. More specifically, in the disclosed embodiments, the aspheric shapes of both surfaces of the second lens element G2 are expressed by using non-zero, even-numbered aspheric coefficients $A_4$, $A_6$, $A_8$, and $A_{10}$. Also, the aspheric shapes of both surfaces of the third lens element G3 are expressed by using non-zero, aspheric coefficients $A_3$–$A_{10}$.

The single focus lens of the present invention satisfies the following condition:

$$0.8 < f1/f < 2.0 \quad \text{Condition (1)}$$

where f1 is the focal length of the first lens element G1, and f is the focal length of the entire single focus lens.

If the ratio of Condition (1) is larger than the upper limit of Condition (1), the refractive power of the first lens element G1 becomes too small, making correction of the distortion aberration difficult. Additionally, it is generally preferred with a digital camera or similar imaging device that uses an image pickup element such as a CCD that the optical path of the light rays be orthogonal or nearly orthogonal to the image plane, defining a telecentric state on the image side. If the ratio of Condition (1) is smaller than the lower limit of Condition (1), the incident angle of light rays onto the detecting surfaces of the image detector at the image plane become undesirably large, failing to satisfy the requirements of orthogonality and telecentricity.

Preferably, the single focus lens also satisfies the following condition:

$$0.5 < (|R2| - R1)/(R1 + |R2|) \quad \text{Condition (2)}$$

where

R1 is the radius of curvature of the object-side surface of the first lens element G1, and R2 is the radius of curvature of the image-side surface of the first lens element G1.

If Condition (2) is not satisfied, the correction of aberrations, particularly distortion aberration, becomes difficult.

Additionally, preferably the following condition is satisfied:

$$1.5 < f3/f < 3.0 \quad \text{Condition (3)}$$

where f3 is the focal length of the third lens element G3, and f is as defined above.

If the ratio of Condition (3) is larger than the upper limit of Condition (3), the incident angle of the light rays onto the detecting surface of the image pickup element at the image plane becomes undesirably large, failing to satisfy the requirements of orthogonality and telecentricity, as discussed previously with regard to Condition (1). Additionally, generally, with an optical system that uses an image pickup element, it is common for an optical element, such as an infrared cut-off filter or a cover glass, to be placed between the image-side lens element and the image plane. Therefore, an adequate back focus distance to make room for these optical elements is necessary. If the ratio of Condition (3) is smaller than the lower limit of Condition (3), the third lens element G3 becomes too close to the image plane, not leaving enough room for these optical elements.

Ease of manufacturing and low cost are primary considerations in construction of the first lens element G1. Glass is the preferred material of the first lens element G1 and spherical is the preferred shape, particularly glass that can be ground and polished to a desired spherical shape. On the other hand, the second lens element G2 and the third lens element G3 are preferably made of an optical resin material, i.e., plastic suitable for lenses, that is formed into the desired aspheric shapes.

Placing the stop St between the first lens element G1 and the second lens element G2 improves the optical performance near the optical axis. Further, by using an aspheric surface in each of the second lens element G2 and the third lens element G3, a significant aberration correction effect can be achieved. In addition, making the aspheric shapes of the lens elements particular shapes so that the refractive power of each aspheric lens surface differs substantially between the central portion near the optical axis and the peripheral portion greatly improves the favorable correction of aberrations, especially the correction of distortion.

A single focus lens constructed as described above may include a small number of lens elements, be compact enough for a portable modular camera, and be produced at low cost but, in addition, through particular use of aspheric surfaces and by satisfying various requirements as described above, it may also achieve a high optical performance that is suitable for digital cameras.

Embodiments 1 and 2 of the present invention will now be individually described with further reference to the drawings. In the following descriptions, references will be frequently made to a "lens element." However, as set forth above, it is understood that lens elements described below are also lens components and may variously be replaced by lens components that include more than one lens element.

Embodiment 1

FIG. 1 shows Embodiment 1 of the present invention. Table 1 below lists the surface number #, in order from the object side, the radius of curvature R (in mm) of each surface near the optical axis, the on-axis surface spacing D (in mm), as well as the refractive index $N_d$ and the Abbe number $v_d$ (both at the d-line of 587.6 nm) of each optical element for Embodiment 1. Listed in the bottom portion of Table 1 are the focal length f, the f-number $F_{NO}$, and the maximum field angle 2ω.

TABLE 1

| # | R | D | $N_d$ | $v_d$ |
|---|---|---|---|---|
| 1 | 3.6684 | 2.00 | 1.48749 | 70.4 |
| 2 | 46.1708 | 1.76 | | |
| 3* | −1.3669 | 1.00 | 1.50869 | 56.0 |
| 4* | −1.7581 | 0.10 | | |
| 5* | 2.4462 | 1.65 | 1.50869 | 56.0 |
| 6* | 3.0652 | 1.84 | | |
| 7 | ∞ | 1.00 | 1.51680 | 64.2 |
| 8 | ∞ | | | | f = 6.13 mm
$F_{NO}$ = 4.8
2ω = 56.9°

The surfaces with a * to the right of the surface number in Table 1 are aspheric lens surfaces, and the aspheric surface shape is expressed by Equation (A) above.

Table 2 below lists the values of the constants K, and $A_3$–$A_{10}$ used in Equation (A) above for each of the aspheric lens surfaces of Table 1. Aspheric coefficients that are not present in Table 2 are zero. An "E" in the data indicates that the number following the "E" is the exponent to the base 10. For example, "1.0E-2" represents the number $1.0 \times 10^{-2}$.

TABLE 2

| # | K | $A_3$ | $A_4$ | $A_5$ | $A_6$ | $A_7$ | $A_8$ | $A_9$ | $A_{10}$ |
|---|---|---|---|---|---|---|---|---|---|
| 3 | −2.3107 | 0 | −4.1808E−2 | 0 | 1.3571E−2 | 0 | −1.8601E−3 | 0 | 1.4069E−4 |
| 4 | −2.2145 | 0 | −6.7017E−2 | 0 | 3.0785E−2 | 0 | −6.7234E−3 | 0 | 5.6865E−4 |
| 5 | −2.3181 | −1.2792E−3 | −3.7406E−2 | 2.9960E−2 | −1.2381E−2 | 6.6544E−3 | −0.0034 | 9.5797E−4 | −1.0389E−4 |
| 6 | −0.9217 | 2.3564E−2 | −5.4381E−2 | 7.8752E−3 | 8.2521E−3 | −2.3741E−3 | −0.0009 | 5.1435E−4 | −7.0501E−5 |

The single focus lens of Embodiment 1 satisfies Conditions (1)–(3) above, as set forth in Table 3 below.

TABLE 3

| Condition No. | Condition | Value |
|---|---|---|
| (1) | 0.8 < f1/f < 2.0 | 1.31 |
| (2) | 0.5 < (\|R2\| − R1)/(R1 + \|R2\|) | 0.85 |
| (3) | 1.5 < f3/f < 3.0 | 2.05 |

Figure 3A:
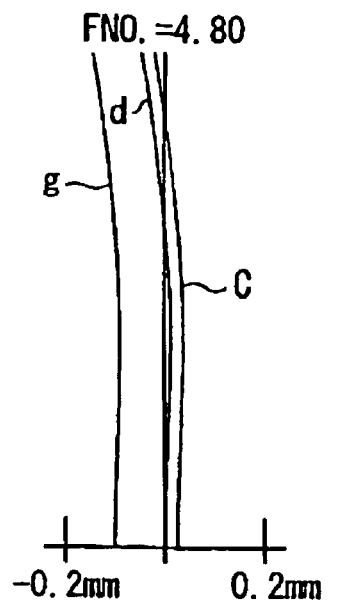
FIGS. 3A–3C show the spherical aberration, astigmatism, and distortion, respectively, of the single focus lens according to Embodiment 1.
Figure 3B:
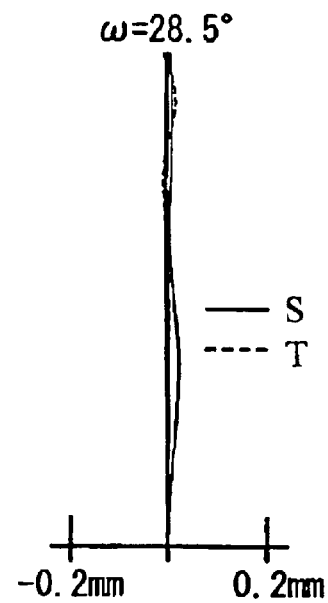
Figure 3C:
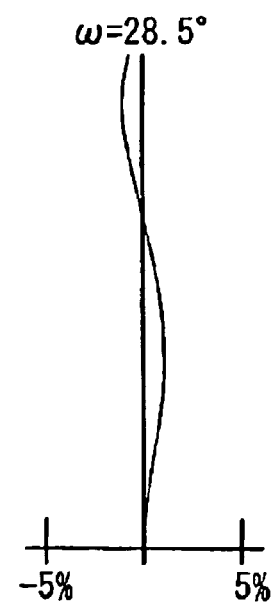

FIGS. 3A–3C show the spherical aberration, astigmatism, and distortion, respectively, of the single focus lens according to Embodiment 1. In FIG. 3A, the spherical aberration is shown for the d-line (λ=587.6 nm), the g-line (λ=435.8 nm), and the C-line (λ=656.3 nm). As shown in FIG. 3A, the f-number is 4.80. In FIG. 3B, the astigmatism is shown at the d-line (λ=587.6 nm) for both the sagittal image surface S and the tangential image surface T. In FIG. 3C, the distortion is shown at the d-line (λ=587.6 nm). The half-field angle ω for FIGS. 3B and 3C is 28.5°.

As is clear from the lens data and aberration curves discussed above, in Embodiment 1 the various aberrations are favorably corrected, and performance capabilities that are suitable for a compact single focus lens can be obtained.

Embodiment 2

Figure 2:
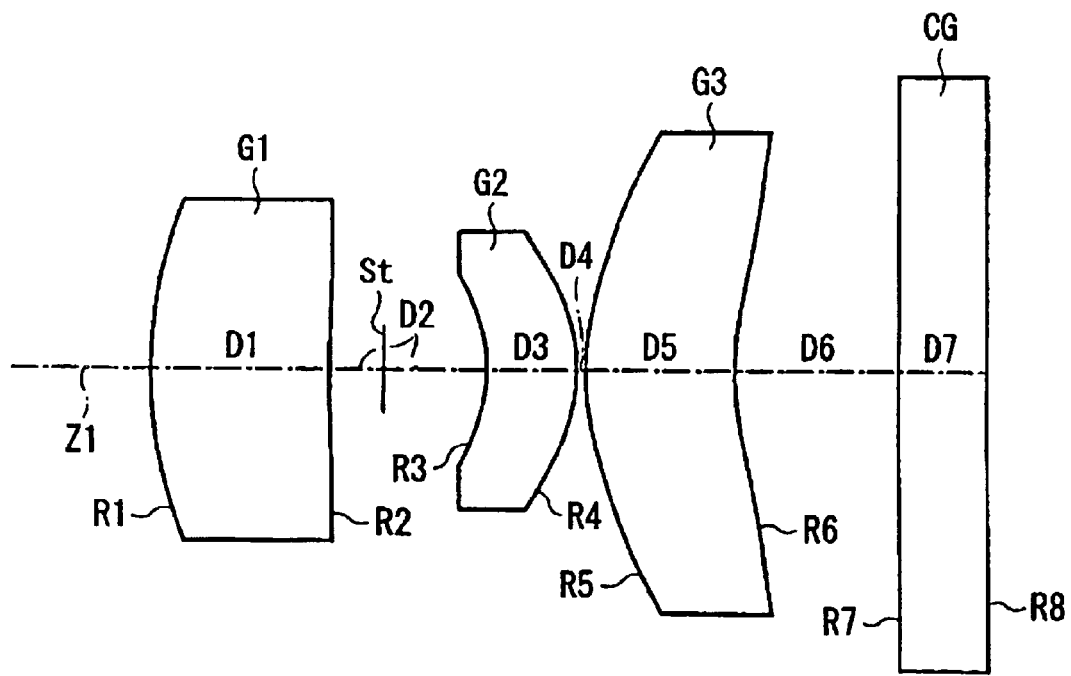
FIG. 2 shows a cross-sectional view of the single focus lens according to Embodiment 2.

FIG. 2 shows Embodiment 2 of the present invention. Table 4 below lists the surface number #, in order from the object side, the radius of curvature R (in mm) of each surface near the optical axis, the on-axis surface spacing D (in mm), as well as the refractive index $N_d$ and the Abbe number $v_d$ (both at the d-line of 587.6 nm) of each optical element for Embodiment 2. Listed in the bottom portion of Table 4 are the focal length f, the f-number $F_{NO}$, and the maximum field angle 2ω.

TABLE 4

| # | R | D | $N_d$ | $v_d$ |
|---|---|---|---|---|
| 1 | 5.0613 | 2.00 | 1.75500 | 52.3 |
| 2 | 22.0996 | 1.74 | | |
| 3* | −1.5385 | 1.00 | 1.50869 | 56.0 |
| 4* | −1.8678 | 0.10 | | |
| 5* | 2.6527 | 1.65 | 1.50869 | 56.0 |
| 6* | 3.4812 | 1.84 | | |
| 7 | ∞ | 1.00 | 1.51680 | 64.2 |
| 8 | ∞ | | | | f = 6.00 mm
$F_{NO}$ = 4.8
2ω = 57.6°
The surfaces with a * to the right of the surface number in Table 4 are aspheric lens surfaces, and the aspheric surface shape is expressed by Equation (A) above.

Table 5 below lists the values of the constants K, and $A_3$–$A_{10}$ used in Equation (A) above for each of the aspheric lens surfaces of Table 4. Aspheric coefficients that are not present in Table 5 are zero. An "E" in the data indicates that the number following the "E" is the exponent to the base 10. For example, "1.0E-2" represents the number $1.0 \times 10^{-2}$.

TABLE 5

| # | K | $A_3$ | $A_4$ | $A_5$ | $A_6$ | $A_7$ | $A_8$ | $A_9$ | $A_{10}$ |
|---|---|---|---|---|---|---|---|---|---|
| 3 | −3.1798 | 0 | −3.7487E-2 | 0 | 1.3890E-2 | 0 | −1.8509E-3 | 0 | 1.4069E-4 |
| 4 | −3.0881 | 0 | −6.6236E-2 | 0 | 3.1347E-2 | 0 | −6.5751E-3 | 0 | 5.8700E-4 |
| 5 | −3.2406 | 3.6658E-3 | −3.8015E-2 | 3.0168E-2 | −1.2383E-2 | 6.6430E-3 | −0.0035 | 9.7369E-4 | −1.0569E-4 |
| 6 | −0.9217 | 2.3564E-2 | −5.4381E-2 | 7.8752E-3 | 8.2521E-3 | −2.3741E-3 | −0.0009 | 5.1435E-4 | −7.0501E-5 |

The single focus lens of Embodiment 2 satisfies Conditions (1)–(3) above, as set forth in Table 6 below.

TABLE 6

| Condition No. | Condition | Value |
|---|---|---|
| (1) | 0.8 < f1/f < 2.0 | 1.38 |
| (2) | 0.5 < (|R2| − R1)/(R1 + |R2|) | 0.63 |
| (3) | 1.5 < f3/f < 3.0 | 2.18 |

Figure 4A:
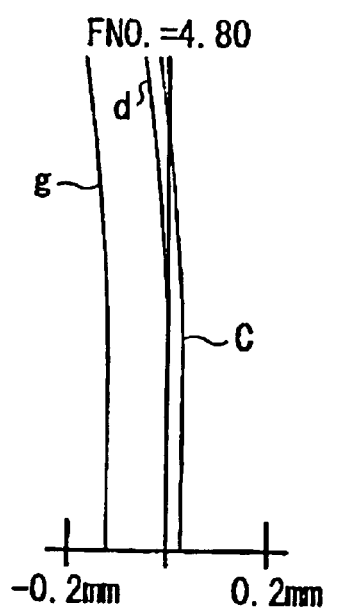
FIGS. 4A–4C show the spherical aberration, astigmatism, and distortion, respectively, of the single focus lens according to Embodiment 2.
Figure 4B:
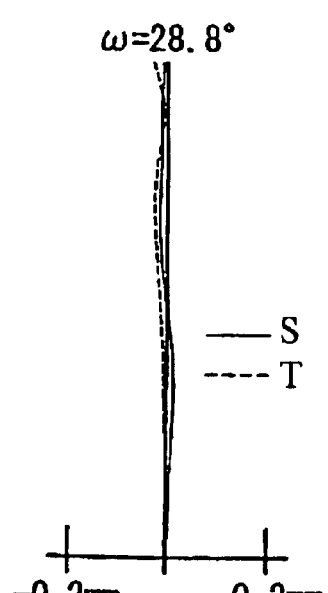
Figure 4C:
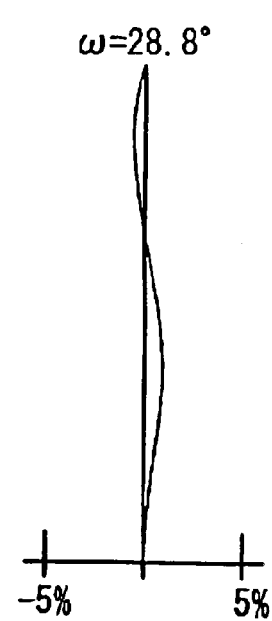

FIGS. 4A–4C show the spherical aberration, astigmatism, and distortion, respectively, of the single focus lens according to Embodiment 2. In FIG. 4A, the spherical aberration is shown for the d-line (λ=587.6 nm), the g-line (λ=435.8 nm), and the C-line (λ=656.3 nm). As shown in FIG. 4A, the f-number is 4.80. In FIG. 4B, the astigmatism is shown at the d-line (λ=587.6 nm) for both the sagittal image surface S and the tangential image surface T. In FIG. 4C, the distortion is shown at the d-line (λ=587.6 nm). The half-field angle ω for FIGS. 4B and 4C is 28.8°.

As is clear from the lens data and aberration curves discussed above, in Embodiment 2 the various aberrations are favorably corrected, and performance capabilities that are suitable for a compact single focus lens can be obtained.

The invention being thus described, it will be obvious that the same may be varied in many ways. For instance, values such as the radius of curvature R of each of the lens elements, the surface spacing D, the refractive index $N_d$, as well as the Abbe number $v_d$, are not limited to the examples indicated in each of the aforementioned embodiments, as other values can be adopted. Also, lens elements that act as lens components may variously be modified as lens components that include more than one lens element. Such variations are not to be regarded as a departure from the spirit and scope of the invention. Rather, the scope of the invention shall be defined as set forth in the following claims and their legal equivalents. All such modifications as would be obvious to one skilled in the art are intended to be included within the scope of the following claims.

What is claimed is:

1. A single focus lens comprising, arranged along an optical axis in order from the object side:
    a first lens component having positive refractive power and having a convex surface on the object side;
    a stop;
    a second lens component having a meniscus shape with a concave surface near the optical axis on the object side, being made of plastic, and having at least one aspheric surface;
    a third lens component having a meniscus shape, positive refractive power, a convex surface on the object side near the optical axis, an aspheric object-side surface, and an aspheric image-side surface;
wherein
    the following condition is satisfied:

0.8<f1/f<2.0 where
    f1 is the focal length of the first lens component, and
    f is the focal length of the entire single focus lens.
2. The single focus lens of claim 1, wherein the following condition is satisfied:

0.5<(|R2|−R1)/(R1+|R2|)

where
    R1 is the radius of curvature of the object-side surface of the first lens component, and
    R2 is the radius of curvature of the image-side surface of the first lens component.
3. The single focus lens of claim 1, wherein the following condition is satisfied:

1.5<f3/f<3.0 where f3 is the focal length of the third lens component.

4. The single focus lens of claim 2, wherein the following condition is satisfied:

$$1.5 < f3/f < 3.0$$

where f3 is the focal length of the third lens component.

5. The single focus lens of claim 1, wherein the first lens component, the second lens component, and the third lens component are arranged in that order along the optical axis from the object side without any intervening lens element.

6. The single focus lens of claim 5, wherein the single focus lens is formed of only three lens components.

7. The single focus lens of claim 6, wherein the single focus lens is formed of only three lens elements.

8. The single focus lens of claim 1, wherein each of the first, second, and third lens components consists of a lens element.

9. The single focus lens of claim 2, wherein the first lens component, the second lens component, and the third lens component are arranged in that order along the optical axis from the object side without any intervening lens element.

10. The single focus lens of claim 9, wherein the single focus lens is formed of only three lens components.

11. The single focus lens of claim 10, wherein the single focus lens is formed of only three lens elements.

12. The single focus lens of claim 2, wherein each of the first, second, and third lens components consists of a lens element.

13. The single focus lens of claim 4, wherein the first lens component, the second lens component, and the third lens component are arranged in that order along the optical axis from the object side without any intervening lens element.

14. The single focus lens of claim 13, wherein the single focus lens is formed of only three lens components.

15. The single focus lens of claim 14, wherein the single focus lens is formed of only three lens elements.

16. The single focus lens of claim 4, wherein each of the first, second, and third lens components consists of a lens element.

17. The single focus lens of claim 1, wherein:

both the object-side surface and the image-side surface of the second lens component are aspheric;

within an effective aperture range of the single focus lens, the absolute value of the negative refractive power of the object-side surface of the second lens component decreases in a direction from the optical axis toward the periphery of the second lens component and the positive refractive power of the image-side surface of the second lens component decreases in a direction from the optical axis toward the periphery of the second lens component; and within an effective aperture range of the single focus lens, the positive refractive power of the object-side surface of the third lens component decreases in a direction from the optical axis toward the periphery of the third lens component.

18. The single focus lens of claim 4, wherein:

both the object-side surface and the image-side surface of the second lens component are aspheric;

within an effective aperture range of the single focus lens, the absolute value of the negative refractive power of the object-side surface of the second lens component decreases in a direction from the optical axis toward the periphery of the second lens component and the positive refractive power of the image-side surface of the second lens component decreases in a direction from the optical axis toward the periphery of the second lens component; and within an effective aperture range of the single focus lens, the positive refractive power of the object-side surface of the third lens component decreases in a direction from the optical axis toward the periphery of the third lens component.

19. The single focus lens of claim 7, wherein:

both the object-side surface and the image-side surface of the second lens element are aspheric;

within an effective aperture range of the single focus lens, the absolute value of the negative refractive power of the object-side surface of the second lens element decreases in a direction from the optical axis toward the periphery of the second lens element and the positive refractive power of the image-side surface of the second lens element decreases in a direction from the optical axis toward the periphery of the second lens element; and within an effective aperture range of the single focus lens, the positive refractive power of the object-side surface of the third lens element decreases in a direction from the optical axis toward the periphery of the third lens element.

20. The single focus lens of claim 16, wherein:

both the object-side surface and the image-side surface of the second lens element are aspheric;

within an effective aperture range of the single focus lens, the absolute value of the negative refractive power of the object-side surface of the second lens element decreases in a direction from the optical axis toward the periphery of the second lens element and the positive refractive power of the image-side surface of the second lens element decreases in a direction from the optical axis toward the periphery of the second lens element; and within an effective aperture range of the single focus lens, the positive refractive power of the object-side surface of the third lens element decreases in a direction from the optical axis toward the periphery of the third lens element.

* * * * *

US006961191C1

(12) INTER PARTES REEXAMINATION CERTIFICATE (533rd)
United States Patent
Sato

(10) Number: US 6,961,191 C1
(45) Certificate Issued: Feb. 15, 2013

(54) SINGLE FOCUS LENS

(75) Inventor: Kenichi Sato, Agco (JP)

(73) Assignee: Fujifilm Corporation, Minato-Ku, Tokyo (JP)

Reexamination Request:
No. 95/001,412, Sep. 17, 2010

Reexamination Certificate for:
Patent No.: 6,961,191
Issued: Nov. 1, 2005
Appl. No.: 10/790,758
Filed: Mar. 3, 2004

(51) Int. Cl.
*G02B 13/18* (2006.01)
*G02B 9/12* (2006.01)
*G02B 9/16* (2006.01)
*G02B 13/00* (2006.01)

(52) U.S. Cl. .................... 359/785; 359/784; 359/792
(58) Field of Classification Search .................... None
See application file for complete search history.

(56) References Cited

To view the complete listing of prior art documents cited during the proceeding for Reexamination Control Number 95/001,412, please refer to the USPTO's public Patent Application Information Retrieval (PAIR) system under the Display References tab.

*Primary Examiner* — Deandra Hughes

(57) ABSTRACT

A single focus lens includes, in order from the object side: a first lens component of positive refractive power with a convex surface on the object side; a diaphragm stop; a second lens component that is made of plastic, has at least one aspheric surface and a meniscus shape, and has a concave surface on the object side near the optical axis; and, a third lens component of positive refractive power with two aspheric surfaces, one of which is convex on the object side near the optical axis. Each lens component that forms the single focus lens may consist of a lens element. Specified conditions are satisfied in order to reduce aberrations, to insure that the light rays at the image plane are substantially orthogonal to the image plane, and to insure that a sufficient back focus is provided to allow for insertion of other optical elements.

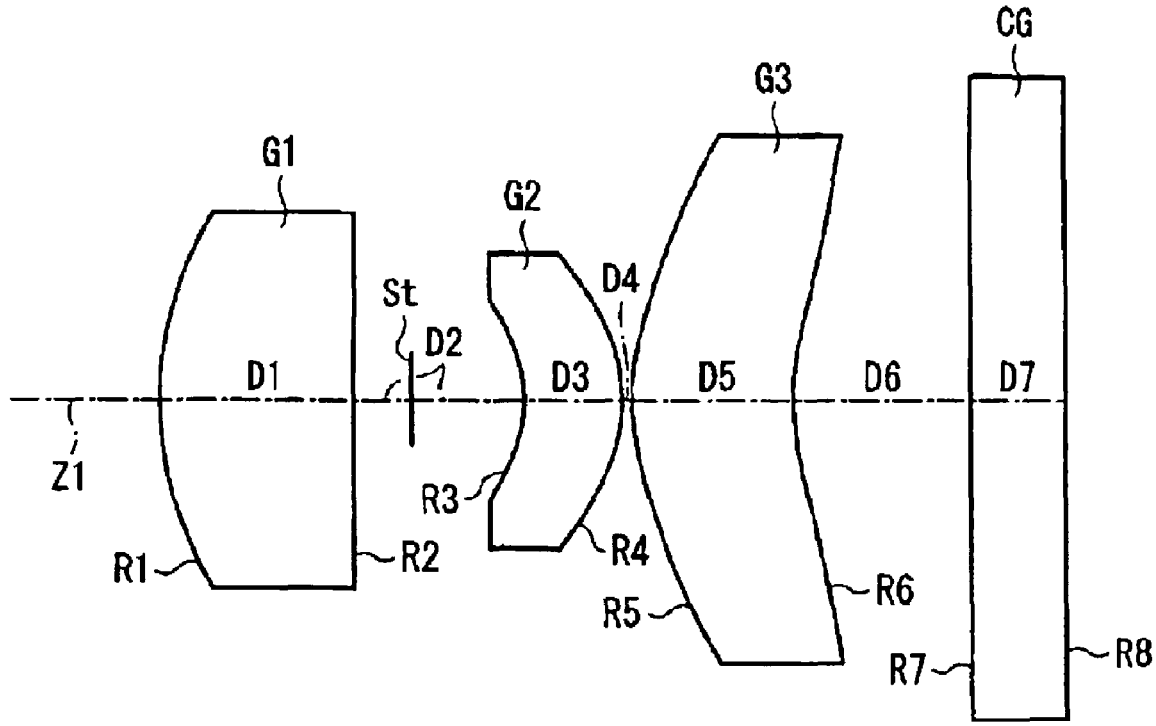

INTER PARTES REEXAMINATION CERTIFICATE ISSUED UNDER 35 U.S.C. 316

NO AMENDMENTS HAVE BEEN MADE TO THE PATENT

AS A RESULT OF REEXAMINATION, IT HAS BEEN DETERMINED THAT:

The patentability of claims 1-20 is confirmed.

* * * * *